United States Patent [19]
Rutishauser

[11] Patent Number: 4,475,677
[45] Date of Patent: Oct. 9, 1984

[54] TRANSPORT APPARATUS FOR CONVEYING A PERFORATED RECORDING MEDIUM TO A PLATEN OR THE LIKE

[76] Inventor: Albert Rutishauser, Rütihofstrasse 40, 8713 Uerikon, Switzerland

[21] Appl. No.: 483,651

[22] Filed: Apr. 11, 1983

[30] Foreign Application Priority Data

Apr. 20, 1982 [CH] Switzerland ........................ 2380/82

[51] Int. Cl.³ ................................................ G03B 1/30

[52] U.S. Cl. .................................. 226/74; 400/616.1; 226/169

[58] Field of Search ................................ 226/169–171, 226/74, 75, 76, 2, 6, 86, 91, 92; 400/616, 616.1, 616.2, 618, 619

[56] References Cited

U.S. PATENT DOCUMENTS 3,880,016 4/1975 Jamieson et al. .
4,088,256 5/1978 Potma et al. ........................ 226/74
4,402,623 9/1983 Biche et al. ........................ 400/618

OTHER PUBLICATIONS

IBM Technical Disclosure Bulletin, vol. 15, No. 6, Nov. 1972, p.1990, *Paper Feed Device*, R. Kaufman et al.

*Primary Examiner*—Leonard D. Christian
*Attorney, Agent, or Firm*—Werner W. Kleeman

[57] ABSTRACT

A transport or conveyor belt provided with prongs and extending around two rollers serves to convey a recording medium to and away from a platen or the like. To facilitate insertion of the starting portion of the recording medium which, for example, may be constituted by continuous forms or form sets the transport belt including the carrier therefor can be pivoted into such a position that the recording medium can be placed with its marginal perforations on the prongs of a threading or insertion roller and into an open guide gap.

9 Claims, 2 Drawing Figures

TRANSPORT APPARATUS FOR CONVEYING A PERFORATED RECORDING MEDIUM TO A PLATEN OR THE LIKE

BACKGROUND OF THE INVENTION

The present invention relates to a new and improved transport or feeding apparatus for conveying a perforated recording medium to a platen or the like, and also relates to a new and improved method of using the inventive transport apparatus for conveying a recording medium perforated on both sides or margins to an office recording machine or the like.

In its more specific aspects, the invention specifically relates to an improved transport or feeding apparatus for conveying a perforated recording medium to a platen or the like, which transport or feeding apparatus contains a driveable endless transport or conveyor belt provided with entrainment or driving prongs or sprockets and extending around two rollers. An infeed run or strand of the transport belt together with a guide surface or face defines a conveying gap, and the conveying gap can be opened for the purpose of introducing the recording medium.

The perforated recording media, for example, may be constituted by continuous or endless forms or form sets and are typically supplied to a typewriter, to an automatic printer or to an accounting or bookkeeping machine. However, it is also possible to use such transport or feeding apparatus for supplying recording media to the printer of a data processing apparatus or of a recording instrument. Usually two such transport apparatuses are arranged in a mirror-image relationship in a paper feeder so as to engage the marginal perforations on both sides of the paper for transport or feeding purposes. The drive thereof occurs by means of the platen or the like which is also driven.

The transport apparatuses, which are also called tractors, are usually arranged above the platen in an oblique position which is rearwardly inclined. The paper is thus supplied to the platen from the same direction as usually is the case during manual introduction or infeed thereof. During this operation that strand or run of the transport or conveyor belt which is rearwardly and downwardly inclined serves as the infeed or supply run or strand while the run or strand which is forwardly and upwardly inclined serves as the outfeed run or strand for the paper which has been written upon. Guide surfaces or faces are located opposite the two runs or strands and together with the transport or conveyor belt each limit a respective conveying or feed gap for the paper, in order to ensure that the prongs of the transport or conveyor belt remain engaged with the marginal perforations of the paper. Due to the position of the infeed run or strand the insertion of the starting portion of the paper is rendered more difficult because the prongs on the side of the infeed run or strand are positioned outside the field of view of the operator.

To facilitate the insertion of the paper web into the underside of the two tractors, it is known, for example, from European patent publication No. 0,049,016 Al, to pivot the tractors together with the guide surfaces upwardly about the upper one of their shafts or axes to such an extent that the infeed runs forwardly and upwardly. The pivot angle required therefor is hardly less than 180°.

To insert the paper web in the prior art equipment it is necessary to tilt open the guide surfaces which bound the conveying gaps at both tractors, to pull the starting portion of the paper web from the rear so as to pass through beneath the tractors and again upwardly in front of the tractors, so as to register and engage the marginal perforations thereof with the prongs of the transport or conveyor belts, and then to again reclose the two guide surfaces. In the known design the guide surfaces are arranged at flaps connected to the tractors and which can be laterally opened. Subsequently, the tractors must be again pivoted into their operative position.

While the prior art design facilitates the immediate or direct attachment of the starting portion of the web with the prongs, a series of disadvantages is associated therewith. In addition to the relatively large number of required manipulations, it is tedious and cumbersome to pull the starting portion of the web so as to pass through below the tractors and to again pull the same upwardly in front of such tractors. On re-pivoting the tractors back into their operative position, the paper web which has been threaded through has to be pulled back again to some extent by hand, since otherwise there exists the danger that the excess length of the paper web will be clamped between a stop and the tractors and becomes crimped or folded. In addition to the aforementioned manipulations, it is then still required to also insert the starting portion of the paper web into the return conveying gap or space.

The large space requirements needed for pivoting the two tractors through a relatively large angle constitutes a further disadvantage of the known design.

In a further construction of transport apparatus for perforated recording media as known, for example, from British patent publication No. 2,023,552A, two transport or conveying units are provided on both sides of the paper web and which engage the perforations. One of the two transport or conveying units comprises an endless transport or conveyor belt provided with driving prongs, while the other of the two transport or conveying units comprises a transport or conveying wheel provided with entrainment prongs. One of the two transport units is arranged in front of the platen and the other one is arranged so as to follow the platen, in order to enable the paper web to be conveyed in both directions as required, for example, for graphic representations.

It is a disadvantage of the transport or conveying wheel of the known transport apparatus that only a small number of entrainment prongs simultaneously engage the marginal perforations of the paper web. This has the inherent danger that the marginal perforations become damaged or even torn. The result can be achieved that a larger number of entrainment prongs simultaneously engage with the marginal perforations by increasing the enclosing or wrap angle around the transport or conveying wheel. However, in such an arrangement there is increased the drawback which results from the different radius when a thick form set is used. Due to the difference in the radii between the inner and the outer sheets in such a form set the faultless engagement of the entrainment prongs with the perforations of the outer sheet is not ensured.

A further disadvantage of the aforementioned transport apparatus is the large distance prevailing between the transport or conveying wheel and the platen. This large distance, on the one hand, makes the insertion difficult and impairs the accuracy of exactly filling-in the pre-printed form sets, on the other hand, if the transport or conveying wheel is intended to define the exact position.

SUMMARY OF THE INVENTION

Therefore, with the foregoing in mind it is a primary object of the present invention to provide a new and improved transport apparatus for conveying a perforated recording medium to a platen or the like, which enables the operator viewing the platen contained in the machine in front of him or her to properly position and insert the starting portion of a recording medium and to operatively drivingly connect the perforations thereof to the entrainment or driving prongs.

Now in order to implement these and still further objects of the invention, which will become more readily apparent as the description proceeds, the transport apparatus of the present development is manifested by the features that, an insertion or threading roller provided with prongs or sprockets or the like and driveable at a circumferential speed synchronous with the transport or conveyor belt is positioned in a fixed reference position with respect to the conveying or feed gap and forwardly thereof on the side of the guide surface, and the transport or conveyor belt and the guide surface are pivotable relative to each other about the shaft or axis of the roller which is at a further distance or more remote from the insertion or threading roller in order to open the conveying gap.

For introducing the starting portion of the paper into the inventive transport apparatus only the conveying gap or space has to be opened, the starting portion of the paper must be inserted, while positioning the perforations thereof, onto the prongs of the insertion or threading roller, and the conveying gap is again closed.

The conveying gap or space can either be opened or closed by pivoting the transport or conveyor belt relative to the guide surface or, respectively, by pivoting the guide surface relative to the transport or conveyor belt. The insertion or threading roller is arranged in a fixed reference position with respect to the guide surface, i.e. the insertion or threading roller is pivotable together with the guide surface in the event that the guide surface is constructed to be pivotable. In case that the conveyor belt is pivotable the guide surface and the insertion or threading roller are stationarily arranged.

The insertion roller, which is placed forwardly of the conveying gap and which serves as a positioning roller, ensures that the perforations on the guide surface are exactly aligned, so that the entrainment or driving prongs of the transport or conveyor belt faultlessly engage the perforations when the conveying gap is closed. It is thus not necessary for the operator to have visual access to the entrainment or driving prongs of the transport or conveyor belt.

The pivoting range of the parts or members which are pivotable relative to each other is relatively small like, for example, 30°, so that no substantial free space is required therefor.

Even when the prongs or the like of the insertion roller remain engaged with the perforations during operation, the tensional force is transferred to the paper web substantially by the action of the driving or entrainment prongs of the transport or conveyor belt. However, the transport or conveyor belt will only contact the paper web along a straight path so that the difficulties mentioned heretofore with reference to thick form sets and occurring when the paper web is forced around in correspondence to the radius of a roll are not present in the transport apparatus according to the invention.

One of the important inventive concepts thus essentially resides in the features that the paper web together with the perforations thereof are applied from above, and specifically within the field of view of the operator, to prongs or the like serving for positioning the same, namely the prongs of the insertion roll, although the entrainment or driving prongs of the tractor effective for the transport operation engage the perforations from the opposite side. Furthermore, the pivotability of either the tractor or of the guide surface is utilized to open the conveying gap or space, so that a separately operated flap becomes superfluous.

In a preferred embodiment of the transport apparatus according to the invention, the guide surface and the insertion roller or roll are arranged stationary and the transport conveyor belt is pivotably arranged. The paper web is thus prevented from moving when the conveying gap or space is closed, so that the same cannot become crushed or upset and also cannot slide-off the prongs of the insertion roller. There is furthermore avoided with such design that the drive elements for the insertion roller must be pivoted.

According to a further design of the transport apparatus according to the invention, the insertion roller is arranged tangentially forwardly of the conveying gap. The advantage thereof is that a linear infeed of the paper web from the tangent of the insertion roller into the conveying gap is thus obtained. However, such an arrangement is not absolutely required.

In another preferred design of the transport apparatus according to the invention, the guide surface possesses an extension or prolongation extending into the region adjacent the circumferential surface of the insertion roller and having a curvature in this region which at least approximately corresponds to the circumferential surface of the insertion roller. With this design there is present a table-like surface or plane adjacent the insertion roller which passes from the circumferential surface of the insertion roller into the plane of the conveying gap or space. Such a surface serves to support the paper web and facilitates the manual holding of the paper web until the conveying gap is closed.

According to another design of the transport apparatus according to the invention the pivoting shaft or axis also is the driving shaft or axis for the transport or conveyor belt. Thus, the driving shaft or axis of the tractor is that shaft or axis which is closest to the platen. In addition to the advantage that the pivot shaft or axis simultaneously also constitutes the driving shaft or axis, there results the further advantage that the transmission elements required between the driven platen and the driving shaft of the tractor are positioned relatively close to each other.

According to a still further design of the transport apparatus according to the invention for simultaneously guiding the recording medium away from the platen a further guide surface is arranged at a stationary linked or hingedly mounted flap and opposite to the other run or strand of the transport or conveyor belt, in order to define a further conveying gap. Accordingly, the further guide surface associated with the outfeed run or strand is not pivotably connected to the tractor, but is stationarily and pivotably linked or connected. In this case the pivoting shaft or axis preferably extends parallel to the transport or conveying direction, so that the flap can be laterally pivoted away. The arrangement may be carried out such that the flap, during pivoting of the tractor in order to open the insertion gap, is conjointly pushed open. In such case the flap is already open without requiring any additional manipulations when the starting portion of the paper web is applied to the outfeed run or strand of the transport or conveyor belt after having been extended around the platen.

The invention also contemplates a method of using the transport apparatus of the present development, which is manifested by the features that, the transport apparatus is used for infeeding a recording medium which is perforated on both of its sides or margins to an office recording machine, wherein two mirror-symmetrically structured transport apparatuses are arranged each to one side of a guide path or guideway, and each respective driven roller and insertion roller thereof are fixed arranged for rotation but axially displaceable upon respective common shafts.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a top plan view of two transport apparatuses according to the invention arranged in a mirror-image or mirror-symmetrical relationship in conjunction with a platen or the like.

DETAILED DESCRIPTION OF THE PREFERRED EMBODIMENTS

Figure 1:
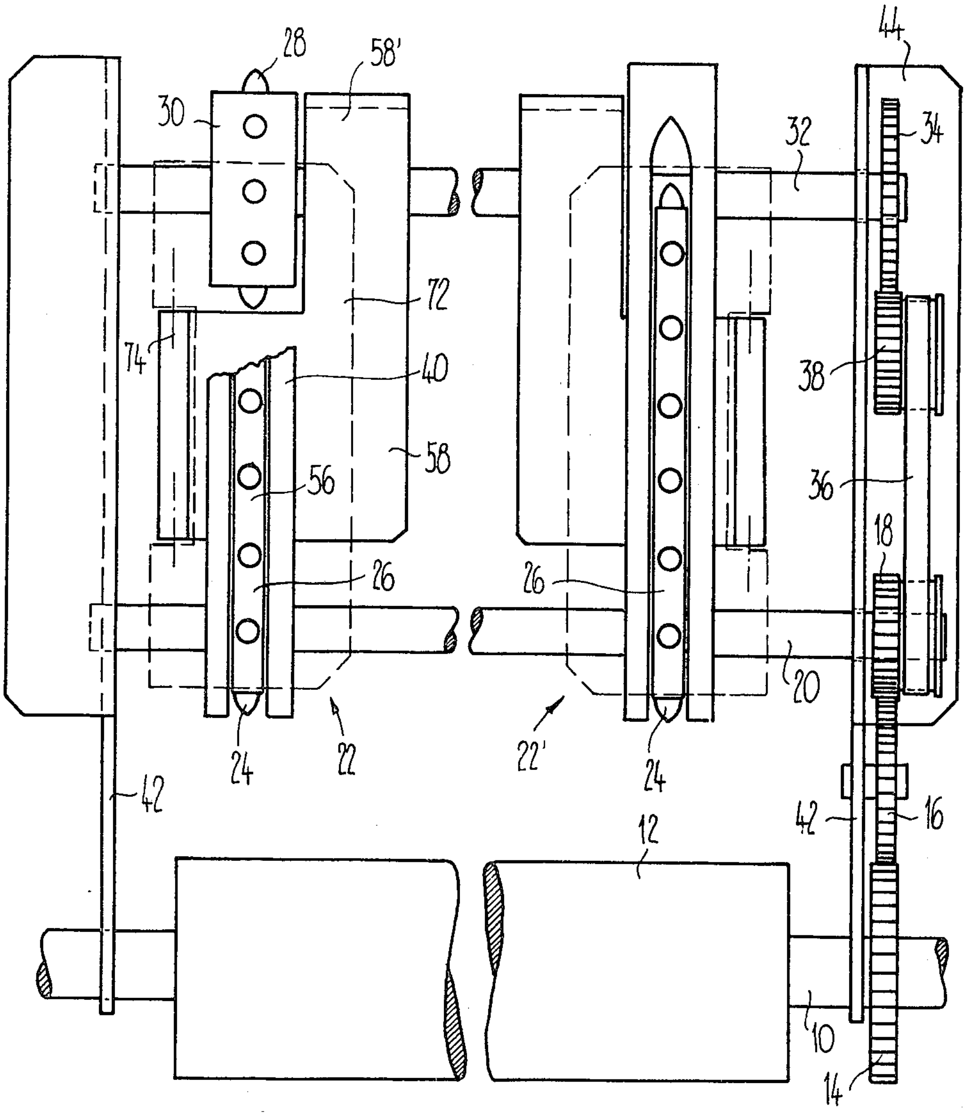

Describing now the drawings, it is to be understood that only enough of the construction of the transport apparatus has been shown as needed for those skilled in the art to readily understand the underlying principles and concepts of the present development, while simplifying the showing of the drawings. According to FIG. 1 of the drawings, which is a top plan view of the two mirror-symmetrically arranged transport apparatuses constructed according to the invention, it will seem that there is arranged on a shaft 10 of a platen 12 or other writing roll or the like a gear wheel or gear 14 by means of which a gear 18 is driven through the action of an intermediate gear 16. The gear 18 is operatively connected to a driving shaft 20 which serves as a drive means for two transport apparatuses 22 and 22' arranged in a mirror-image or mirror-symmetrical relationship.

Each of the two transport apparatuses 22 and 22' comprises an endless transport or conveyor belt 26 provided with driving prongs or sprockets 24 or the like and an insertion or threading roller 30 provided with prongs or sprockets 28 or the like. The driving prongs 24 of the transport or conveyor belt 26 and the prongs 28 of the insertion roller 30 are arranged in a common plane, so that they may successively engage the marginal perforations of a recording medium 66 which has only been shown in FIG. 2. The two transport apparatuses 22 and 22' are intended to engage the marginal perforations on both sides of the recording medium 66.

The insertion rollers 30 are fixedly connected for rotation with a driving shaft 34, but are axially displaceable on such driving shaft 32 which is rigidly connected for rotation with a gear 34. The driving shaft 32 is driven via the gear 34 by means of a toothed belt 36 and a further intermediate gear 38 starting from the first mentioned driving shaft 20. Thus, the two driving shafts 20 and 32 are positively and drivingly interconnected. By means of such a driving connection the insertion roller 30 is driven in synchronism with the transport or conveyor belt 26 in such a manner that the insertion roller 30 has the same circumferential speed as the transport belt 26. Furthermore, such a driving connection ensures that the distance of the prongs 28 or the like on the insertion roller 30 is permanently maintained with respect to the distance of the driving prongs 24 or the like of the transport belt 26, so that the marginal perforations of the recording medium 66 are aligned with the driving prongs 24 of the transport belt 26 when the prongs 28 on the insertion roller 30 are already engaged with the marginal perforations.

In the transport apparatus 22 which is shown at the left-hand side of FIG. 1 the transport belt 26 including a support or carrier 40 therefor is illustrated in broken lines in order to reveal the insertion roller 30. The transport apparatus 22' shown on the right-hand side of the drawing is shown in its entire top plan view, so that the insertion roller associated with the transport apparatus 22' is not visible.

A frame 42 serves to rotatably mount or journal the driving shafts 20 and 32. For mounting purposes the frame 42 extends beyond the shaft 10 of the platen 12 and upon which shaft 10 the frame 42 is retained by means of conventional and therefore not particularly shown latches or the like. The transmission elements 18, 34, 36 and 38 are covered by a cover hood member or cover 44.

Figure 2:
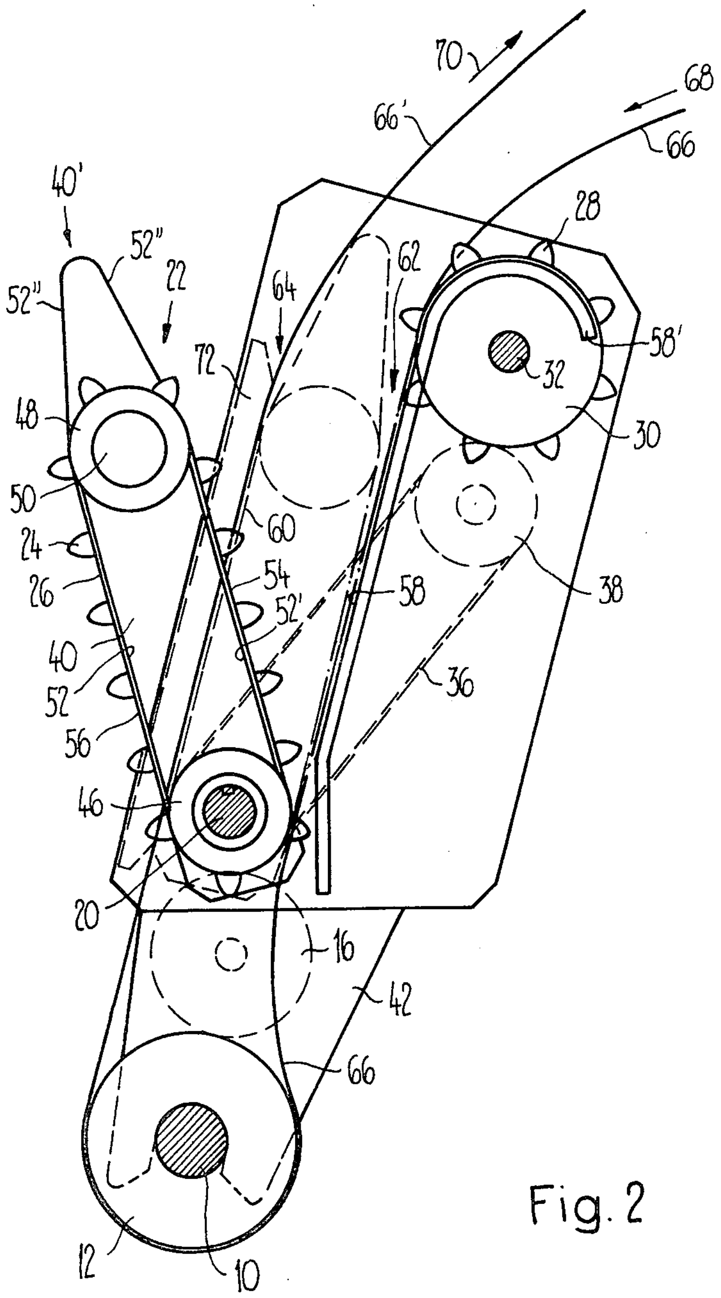
FIG. 2 is a side view of one of the transport apparatuses shown in FIG. 1.

In FIG. 2 there will be recognized the platen 12 arranged on the shaft 10. The frame 42 provides a connection from the shaft 10 to the transport apparatus 22. The endless transport belt 26 provided with the entrainment or driving prongs 24 extends around two rollers 46 and 48. The roller 46 is positively or form-lockingly, however, axially displaceably connected to the drive shaft 20. The transport belt 26 is positively or form-lockingly connected to the driven roller 46 in that it is constructed like, for example, a toothed belt. However, a different positive connection is also possible as described, for example, in Swiss Pat. No. 615,624. The following or entrained roller 48 is freely rotatably journaled on a pin or plug 50 fixedly connected for rotation to the support or carrier 40.

The transport belt 26 is trained around the support or carrier 40. The support or carrier 40 can be pivoted about the drive shaft 20 conjointly with the transport belt 26 and the entrained roller 48, so as to assume the position indicated by reference character 40'. The support or carrier 40 contains contact or supporting surfaces 52 and 52' which extend in the plane of the two belt runs or strands 56 and 54, respectively. The two supporting surfaces 52 and 52' are provided with prolongations or extensions 52" which are joined or unite at an angle and serve to manually pivot the support or carrier 40 into and back from the position indicated by reference character 40' for directing the paper to a suitable storage or deposit.

A first and a second guide surface 58 and 60, respectively, are positioned opposite the two belt runs or strands 54 and 56, respectively of the transport belt 26 and each together with the respectively associated run or strand 45 and 46 form a first and a second conveying gap or space 62 and 64, respectively, for the recording medium 66 which is to be conveyed. The recording medium 66 is withdrawn from a suitable reservoir or supply in the conveying direction 68, is guided around the platen 12 and written-on at the platen 12, whereafter it is outfed in the conveying or transport direction 70.

The first guide surface 58 has an extension or prolongation 58' extending around part of the circumference of the insertion roller 30. The radius of this extension 58' approximately corresponds to the radius of the insertion roller 30. The first and second guide surfaces 58 and 56 are slotted at the region of the entrainment or driving prongs 24 located on the transport belt 26.

The second guide surface 60 is formed by one side of a stationary linked or hingedly connected flap 72 which may be opened by pivoting the same about a schematically indicated axis or shaft 74 for insertion of the portion 66' of the recording medium 66 which is guided out of the transport apparatus. The pivotable flap or flap member 72 may be arranged in such a manner that it may be pushed open when the transport belt 26 is pivoted towards the outside.

To tension the recording medium 66 between the transport belt 26 and the platen 12 there is provided a suitable spring-loaded tensioning roller (not shown). The platen 12 is driven by standard drive means which thus have not been particularly illustrated. It is also possible to manually turn the platen 12 when the recording medium 66 is inserted.

While there are shown and described present preferred embodiments of the invention, it is to be distinctly understood that the invention is not limited thereto, but may be otherwise variously embodied and practiced within the scope of the following claims. Accordingly,

What I claim is:

1. A transport apparatus for conveying a perforated recording medium to a platen, comprising:

a driveable endless transport belt forming an infeed run and provided with entrainment prongs;

two rollers about which said transport belt is trained;

a first guide surface;

a first conveying gap bounded by said infeed run and said first guide surface;

an insertion roller positioned in a fixed reference position with respect to said first conveying gap and forwardly thereof at a side of said first guide surface;

said insertion roller being provided with prongs and being driveable at a circumferential speed which is essentially in synchronism with said transport belt;

one of said two rollers being positioned at a greater distance from said insertion roller than the other of said two rollers and having an axis; and means for mounting said transport belt and said first guide surface so as to be pivotable relative to one another about said axis of said one roller in order to open up said first conveying gap.

2. The transport apparatus as defined in claim 1, wherein:

said first guide surface and said insertion roller are stationarily arranged; and said mounting means pivotably mounts said transport belt.

3. The transport apparatus as defined in claim 1, wherein:

said insertion roller is tangentially arranged forwardly of said first conveying gap.

4. The transport apparatus as defined in claim 1, wherein:

said insertion roller has a circumferential surface;

an extension provided at said first guide surface;

said extension extending into a region adjacent to said circumferential surface of said insertion roller; and said extension having a curvature at said region which at least approximately corresponds to the curvature of said circumferential surface of said insertion roller.

5. The transport apparatus as defined in claim 1, further including:

a drive shaft for driving said transport belt and simultaneously forming a pivot axis constituting said axis of said one roller.

6. The transport apparatus as defined in claim 1, wherein:

said transport belt has a further run located opposite said infeed run;

a second guide surface formed at a stationary but pivotably mounted flap member arranged opposite said further run;

a second conveying gap bounded by said second guide surface and said further run of said transport belt; and said second conveying gap serving to guide the recording medium away from said platen.

7. A method of using a transport apparatus for conveying a recording medium perforated on both marginal sides to an office recording machine and comprising a driveable endless transport belt forming an infeed run and provided with entrainment prongs, two rollers about which said transport belt is extended, a guide surface, a conveying gap bounded by said infeed run and said guide surface, an insertion roller positioned in a fixed reference position with respect to said conveying gap and forwardly thereof on a side of said guide surface, said insertion roller being provided with prongs and being driveable at a circumferential speed essentially in synchronism with said transport belt, one of said two rollers being positioned more distant from said inserting roller than the other roller and having an axis, and said transport belt and said guide surface being pivotable relative to each other about said axis of said one roller to open up said conveying gap, said method comprising the steps of:

arranging two substantially mirror-symmetrically structured ones of said transport apparatuses each at one side of a guide path for the recording medium; and arranging each of the respective driven rollers and insertion rollers thereof fixedly for rotation but axially displaceable on a respective common shaft.

8. The method as defined in claim 7, further including the step of:

positively and drivingly interconnecting said respective common shafts.

9. The method as defined in claim 8, further including the step of:

positively and drivingly connecting the common shaft at which there are mounted the driven rollers of said transport belt to a platen of a typewriter constituting said office recording machine.

* * * * *